(12) United States Patent
Kosugi (10) Patent No.: US 7,936,398 B2
(45) Date of Patent: May 3, 2011

(54) VIDEO SIGNAL PROCESSING APPARATUS FOR CONVERTING VIDEO SIGNAL TYPES

(75) Inventor: Takamichi Kosugi, Sagamihara (JP)

(73) Assignee: Canon Kabushiki Kaisha (JP)

( * ) Notice: Subject to any disclaimer, the term of this patent is extended or adjusted under 35 U.S.C. 154(b) by 911 days.

(21) Appl. No.: 11/197,299

(22) Filed: Aug. 5, 2005

(65) Prior Publication Data

US 2006/0028571 A1 Feb. 9, 2006

(30) Foreign Application Priority Data

Aug. 6, 2004 (JP) ................................. 2004-231455
Jun. 24, 2005 (JP) ................................. 2005-184948

(51) Int. Cl.
*H04N 7/01* (2006.01)
(52) U.S. Cl. ...................................................... 348/445
(58) Field of Classification Search .................. 348/445; 386/131
See application file for complete search history.

(56) References Cited

U.S. PATENT DOCUMENTS

| 6,055,018 | A  | * | 4/2000  | Swan ............................. 348/448 |
| 2002/0140952 | A1 | * | 10/2002 | Fukasawa ....................... 358/1.6 |
| 2003/0016293 | A1 | * | 1/2003  | Hamamura ................. 348/231.3 |
| 2004/0114049 | A1 | * | 6/2004  | Arora .............................. 348/445 |
| 2004/0257141 | A1 | * | 12/2004 | Waki .............................. 327/309 |
| 2005/0219416 | A1 | * | 10/2005 | Gielow ........................ 348/556 |

FOREIGN PATENT DOCUMENTS

| JP | 2000059586 A | * | 2/2000 |
| JP | 2002-190994 A |   | 7/2002 |
| JP | 2002-230899 A |   | 8/2002 |

OTHER PUBLICATIONS

Manual of BD/DVD recorder (No. DMR-E700BD) manufactured by Matsushita Electronic Industrial Co., Ltd. 2004/6., pp. 54-55. Cited in O.A. issued in corresponding JP 2005-184948 dated Dec. 8, 2009. Partial English translation provided.

* cited by examiner

*Primary Examiner* — Timothy J Henn
(74) *Attorney, Agent, or Firm* — Rossi, Kimms & McDowell LLP (57) ABSTRACT

A video signal processing apparatus that converts, into a video signal of a desired type, the type of a video signal received at an external input terminal, and enables the recording or the display of the video signal. The video signal processing apparatus displays, on a screen, information concerning the conversion of the type of a video signal.

8 Claims, 9 Drawing Sheets

| DISCRIMINATION VOLTAGE | 5V | 2.2V | 0V |
|---|---|---|---|
| DISCRIMINATION SIGNAL 1 | 1125 | 750 | 525 |
| DISCRIMINATION SIGNAL 2 | PROGRESSIVE | ----- | 2:1 INTERLACE |
| DISCRIMINATION SIGNAL 3 | 16:9 | 4:3 LETTER BOX | 4:3 |

VIDEO SIGNAL PROCESSING APPARATUS FOR CONVERTING VIDEO SIGNAL TYPES

BACKGROUND OF THE INVENTION

1. Field of the Invention

The present invention relates to a video signal processing apparatus and a video signal processing method that are appropriate for employment for a video apparatus, such as a video camera, a television or a video recorder.

2. Related Art of the Invention

Conventionally, a plurality of video signal types are available in the technological field of employment as video apparatuses such as video cameras, televisions and video recorders. Different video signal types provide different resolution and the aspect ratio of a screen.

Some video apparatuses exhibit compatibility relative to multiple input signals of different video signal types. For example, television receivers and video decks have been proposed that can display or record a picture in accordance with the type of input signal. A reference that discloses a technique of this type is Japanese Patent Laid-Open Publication No. 2002-190994, which is related to a wide display. According to this technique, the aspect ratio of an input signal is detected from a discrimination signal received at a "D terminal", which is one of several analog signal input terminals, and the detection results are used for the automatic conversion of the aspect ratio.

In this conventional arrangement, however, a user may not be able to identify the type of conversion process that is being performed, as well as for which input signal a picture is currently being displayed. Further, when recording is performed using a video recorder, if the user receives no notification of the type of input signal and the type of video signal to be recorded, a problem is encountered, e.g., a picture can not be correctly displayed or recorded, a picture having an unexpected form is recorded, or recording times are not matched.

SUMMARY OF THE INVENTION

One objective of the present invention is to resolve the above described problem.

Another objective of the invention is to permit a user to easily identify the state of the video signal type of an input signal when the conversion of the video signal type is accomplished.

To achieve these objectives, according to one aspect of the invention, a video signal processing apparatus comprises:

an external input terminal;

a signal discrimination unit, for discriminating a type of a video signal entered at the external input terminal;

a signal conversion unit, for converting the type of the video signal in accordance with a discrimination result obtained by the signal discrimination unit; and a display control unit, for, when the signal conversion unit performs a conversion for the video signal, displaying on a display screen information concerning the types of video signals, available for the conversion.

According to another aspect of the invention, a video signal processing method comprises:

a signal discrimination step of discriminating a type of a video signal entered at an external input terminal;

a signal conversion step of converting the type of the video signal in accordance with a discrimination result obtained in the signal discrimination step; and a display control step of, when conversion of a video signal is to be performed at the signal conversion step, displaying on a display screen information related to the types of video signals, available for the conversion.

The other objectives and features of the present invention will become obvious through the following detailed description of the preferred embodiment of the present invention, presented while referring to the accompanying drawings.

DETAILED DESCRIPTION OF THE PREFERRED EMBODIMENTS

The preferred embodiments of the present invention will now be described in detail while referring to the accompanying drawings.

First Embodiment

Figure 1:
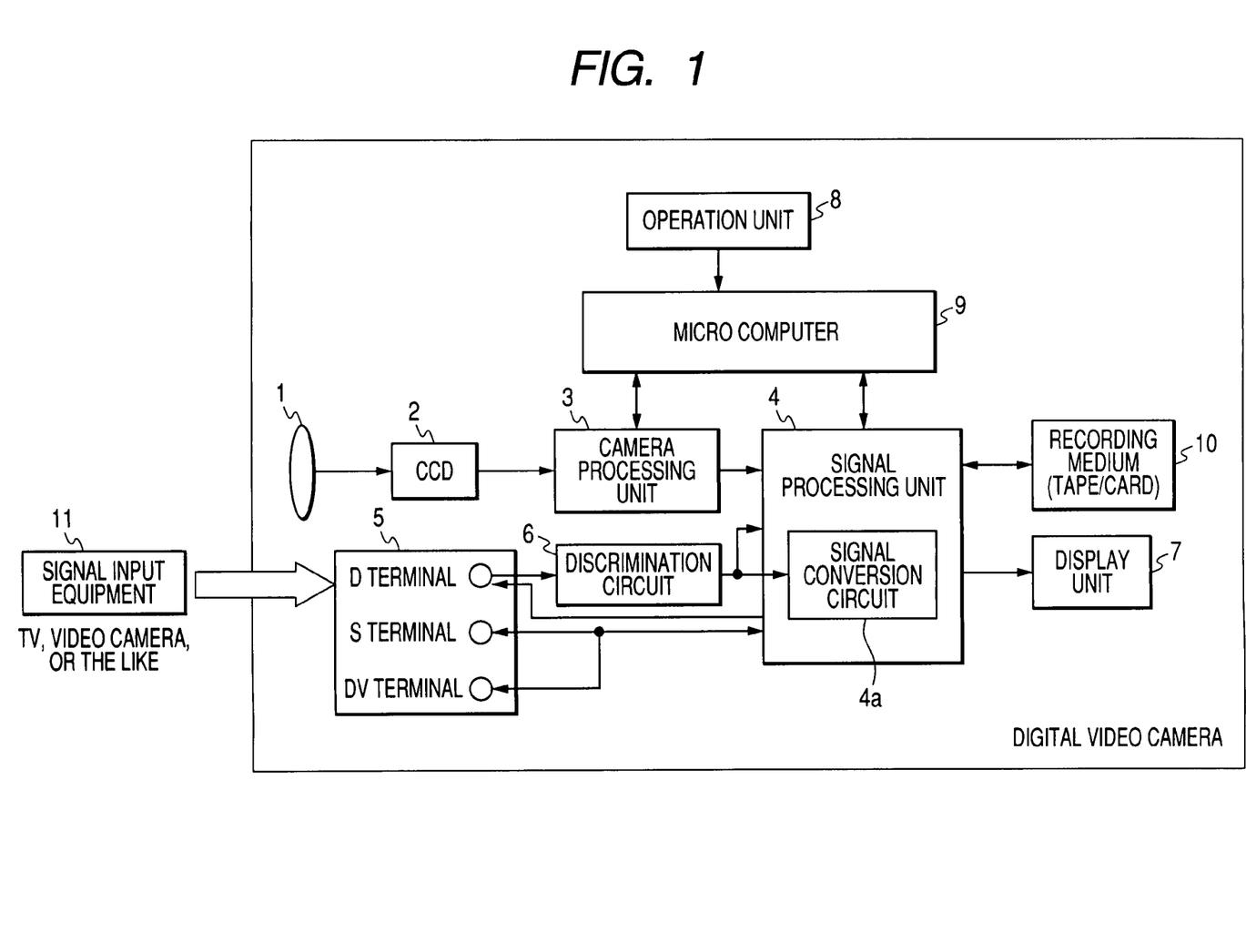
FIG. 1 is a block diagram showing an example configuration of a digital video camera.

FIG. 1 is a block diagram showing an example configuration for a camera-integrated video recorder (a digital video camera) that embodies a video signal processing apparatus according to the present invention. In FIG. 1, the digital video camera comprises: a lens 1; a CCD 2; a camera processing unit 3; a signal processing unit 4, which includes a signal conversion circuit 4a; video and audio input/output terminals 5, including a D terminal and an S terminal (for analog signal input/output) and a DV terminal (for digital signal input/output) namely IEEE1394 interface; a discrimination circuit 6; a display unit 7, for displaying images; an operation unit 8, used by a user to enter various instructions; a micro computer 9, which includes a CPU, a RAM and a ROM (none of them shown); and a recording medium 10, arranged so as to record and reproduce data on and from a magnetic tape or a memory card. Instead of a magnetic tape, an optical disk may be employed.

In the digital video camera having the configuration shown in FIG. 1, the CCD 2 converts an object image, obtained through the lens 1, into an electric signal. The camera processing unit 3 and the signal processing unit 4 perform predetermined processes on the electric signal, and display the resultant signal on the display unit 7. In addition, the signal processing unit 4 performs compression encoding on the electric signal and records the encoded signal on the recording medium 10.

The digital video camera in this embodiment can input and output a video signal using the input/output terminals 5. Especially for a signal received through the D terminal from external signal input equipment 11 (e.g., a television or another video camera), discrimination of the type of video signal is performed by the discrimination circuit 6, and a required signal process is performed by the signal processing unit 4. The operation performed by the signal conversion circuit 4a of the signal processing unit 4 depends on the signal type, and the operation performed by this circuit will be described later while referring to FIG. 2. The video signal, subjected to the signal processing, is ready to be displayed on the display unit 7, and as needed, is compressed and encoded by the compression and encoding unit (not shown) of the signal processing unit 4 to be recorded on the recording medium 10. The operations performed by the individual sections of the digital video camera are controlled by the micro computer 9.

An explanation will be given in which it is assumed that a video signal is to be input at the D terminal, which serves as the input/output terminal 5, and that the operating mode of the digital video camera is a recording mode.

Figure 2:
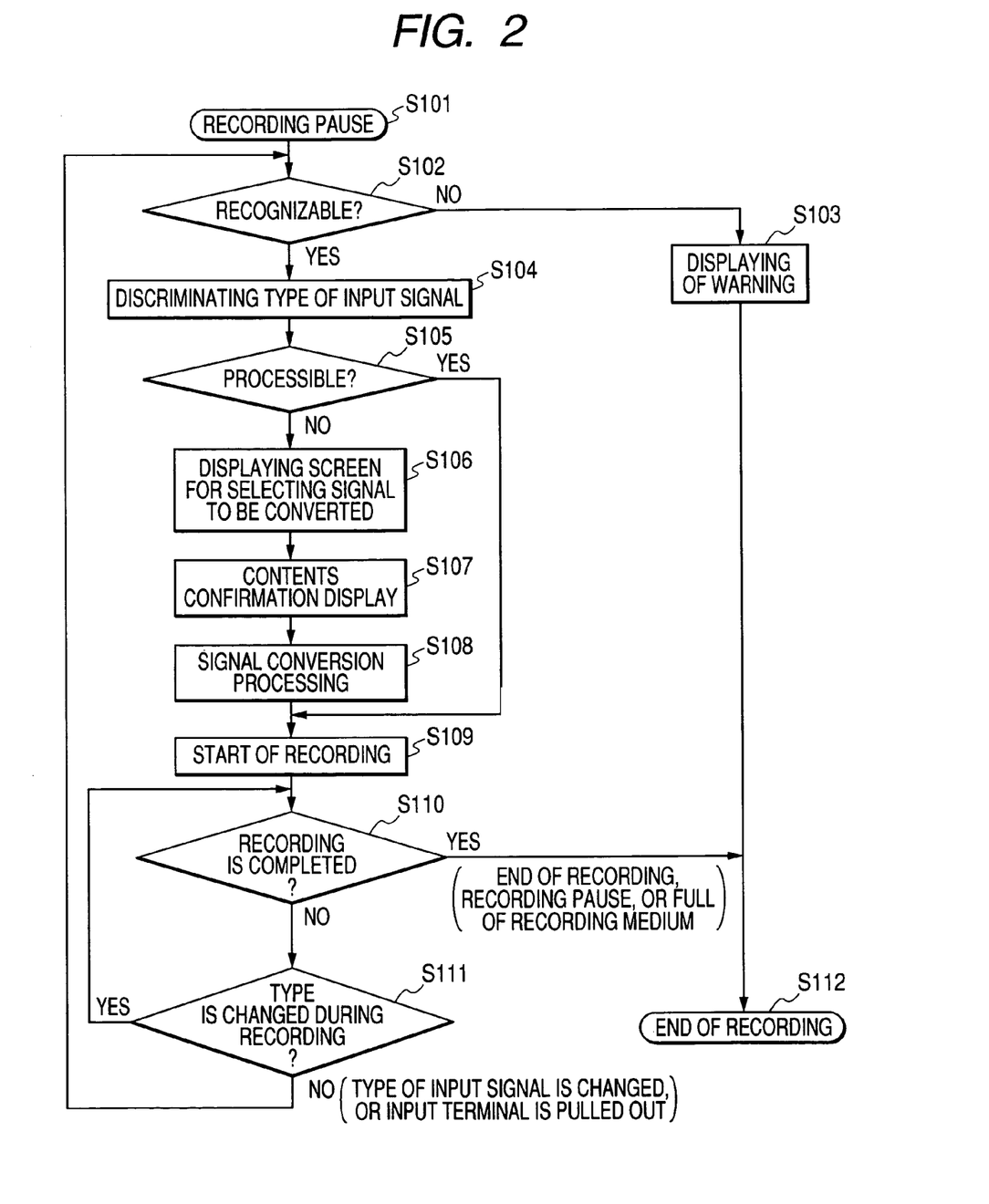
FIG. 2 is a flowchart for explaining the operation of a digital video camera according to a first embodiment of the present invention.

The operation procedures for the digital video camera will now be described while referring to the flowchart in FIG. 2.

Figure 3:
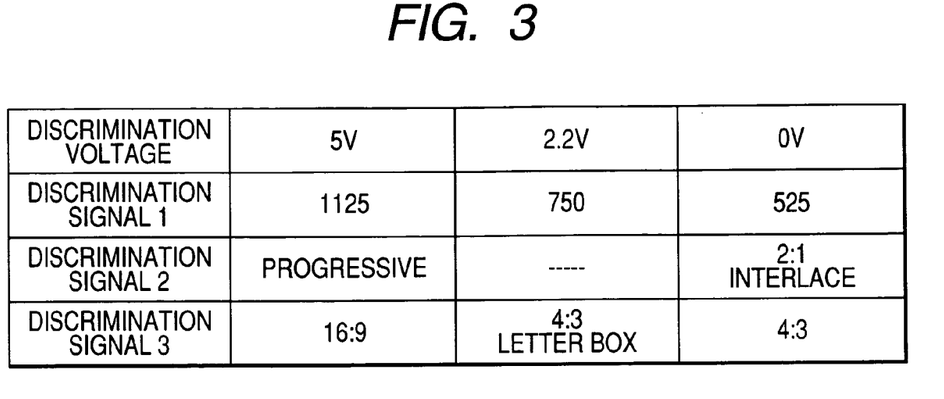
FIG. 3 is a diagram showing a format that is concerned with "D terminal"

First, a recording pause is set at step S101. Then, at step S102, video signal discrimination is performed to determine whether the signal input at the D terminal is recognizable. This discrimination process is performed to determine whether the type of the input signal conforms to the format that is concerned with "D terminal" that shown in FIG. 3. When the format of the input signal is that in FIG. 3, the signal is recognizable. As a specific method for video signal discrimination, the discrimination circuit 6 identifies discrimination voltages (5 V+0/−1.5), (2.2 V+0.2/−0.8) and (0 V) of three discrimination signal lines belonging to the D terminal.

Figure 4:
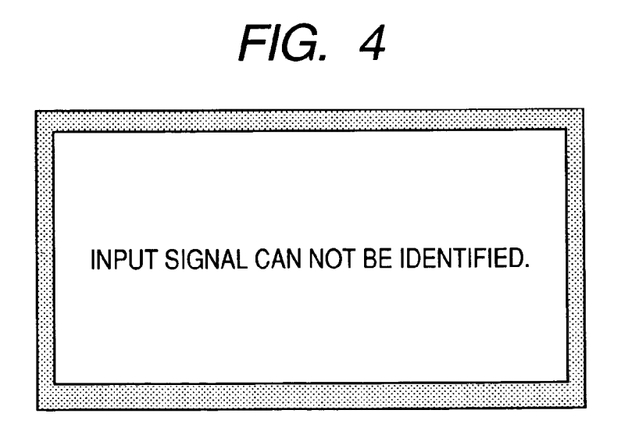
FIG. 4 is a diagram showing an example wherein a warning is displayed on a display unit.

When, as a result of the discrimination process, it is determined that the input signal is not recognizable (NO at step S102), program control is shifted to step S103, and a warning, shown, for example, in FIG. 4, is either displayed on the display unit 7 or, at the least, output as audio.

When, as a result of the discrimination process performed at step S102, it is determined that the input signal is recognizable (YES at step S102), program control advances to step S104 and an examination is performed to determine the type of signal input. Following this, at step S105, a check is performed to determine whether the input signal can be processed in its current form and can be recorded, for example, without being changed. When it is determined that the input signal can be processed without its form being changed (YES at step S105), program control jumps to step S109 and recording is started without conversion of the input signal type being performed.

Figure 5:
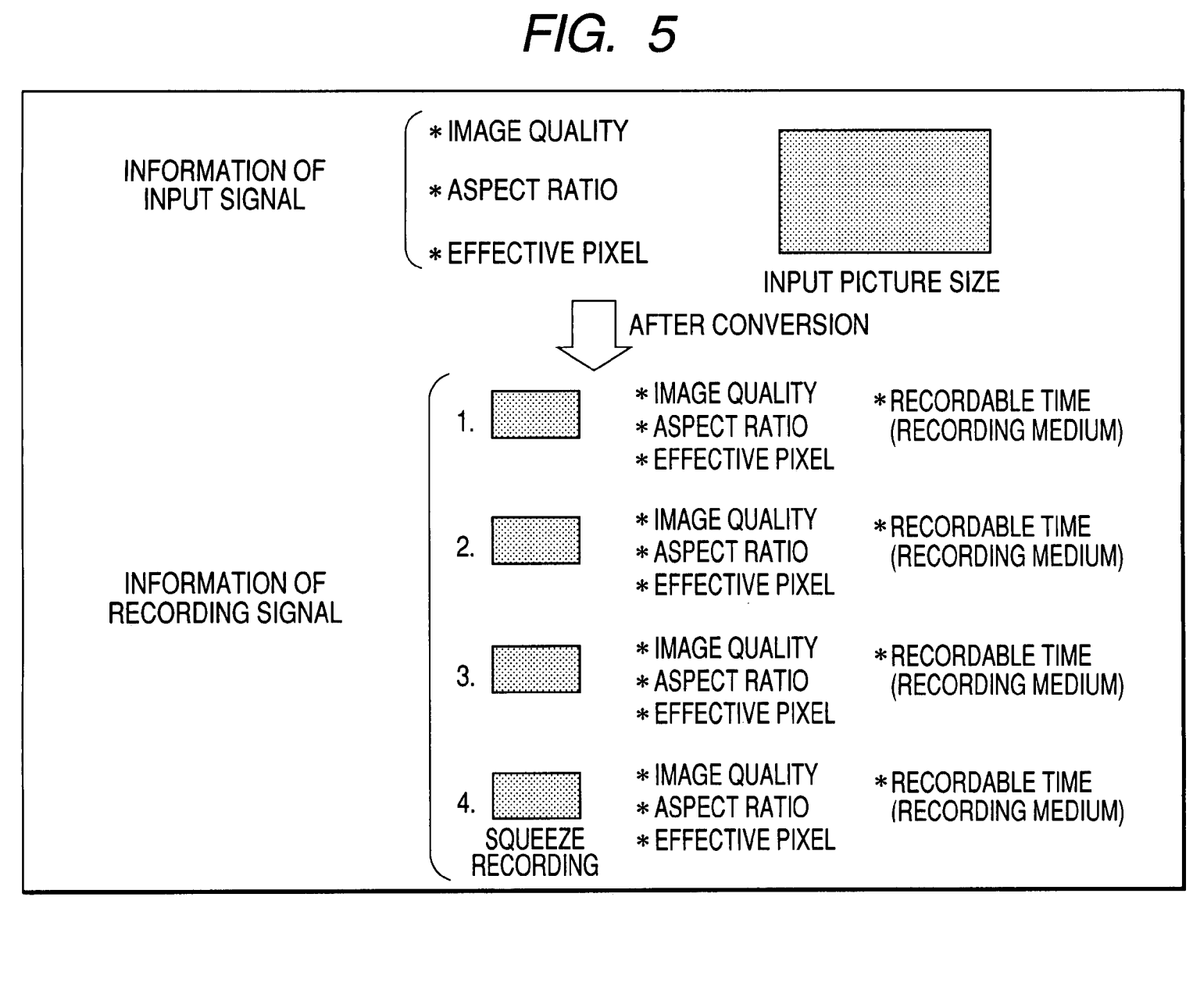
FIG. 5 is a diagram showing an example display wherein information for a conversion process is provided for a user.

When, as a result of the process at step S105, it is determined that the input signal can not be processed without changing its form (NO at step S105), program control advances to step S106, and the process for converting the input signal is initiated. At this time, a screen shown in FIG. 5 is displayed on the display unit 7 to provide a user with information for consequences of the conversion, so that the user can easily see and select a signal type and a recording medium.

In this embodiment, at least one of "image quality", "aspect ratio", "effective pixel" and "input picture size" is displayed as information for an input signal. Further, following the conversion, at least one of "image quality", "aspect ratio", "effective pixel", "recording picture size" and "recordable time", and "recording medium", which is a recording destination, is displayed as information for a recording signal. In addition, as shown in FIG. 5, multiple patterns of different types may be displayed as information for a recording signal.

Figure 6:
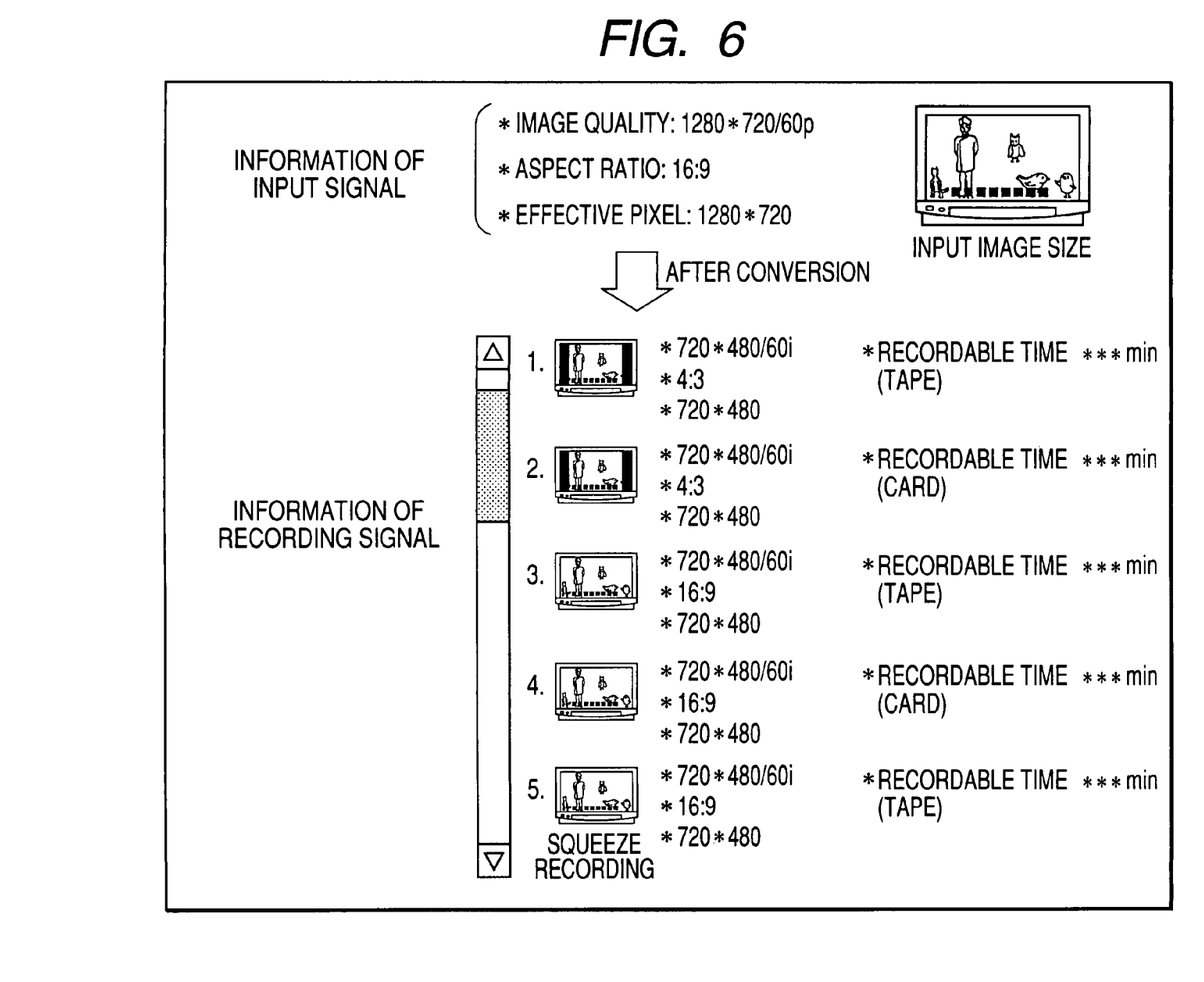
FIG. 6 is a diagram showing an example screen for confirming the contents of the conversion process.

Specifically, information for the current input signal and information for a recordable signal can be displayed as shown in FIG. 6. The display in FIG. 6 is an example screen for confirming the contents of the conversion process at step S107. Further features of the digital video camera in this embodiment lies in that information related to a recording signal obtained by conversion is provided so that a user can easily see, and that the user can employ, on the contents confirmation display presented at step S107, the operation unit 8 to select a desired type of recording signal and a desired recording medium as a recording destination.

FIG. 6 shows a first example conversion process for an input signal, in which an input signal of "image quality: 1280*720/60p", "aspect ratio: 16:9" and "effective pixel: 1280*720" is received. In this case, a recording signal available through conversion is, for example, "image quality: 720*480/60i" and "aspect ratio: 4:3" or "aspect ratio: 16:9", or "image quality: 1920*1080/60i". A selectable recording medium may be a tape or a card (a memory card). Reference screens for currently selectable conversion patterns are shown in FIG. 6.

Figure 7:
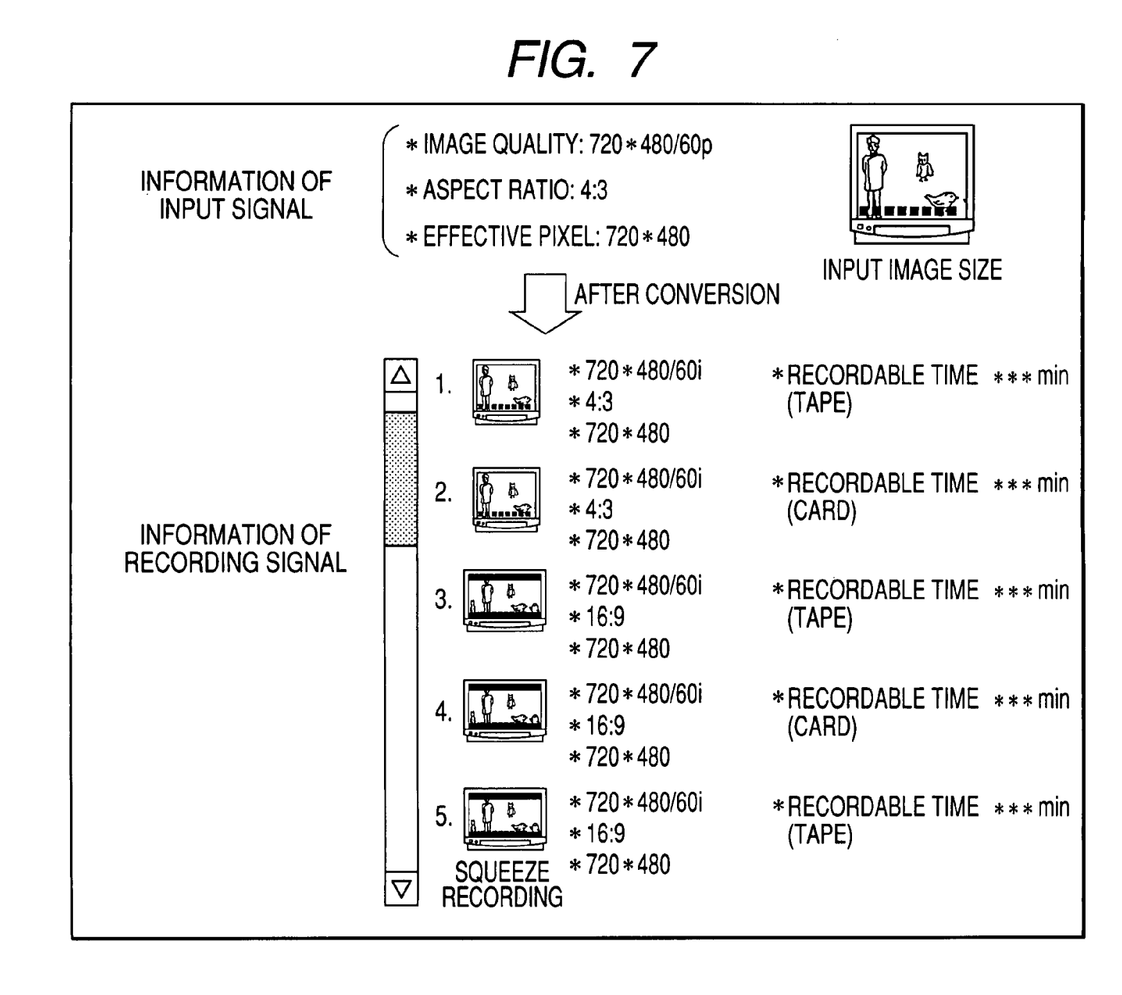
FIG. 7 is a diagram showing another example screen for confirming the contents of the conversion process.

FIG. 7 shows a second example conversion process for an input signal, in which an input signal of "image quality: 720*480/60p", "aspect ratio: 4:3" and "effective pixels: 720*480" is received. In this case, a recording signal available through conversion is, for example, "image quality: 720*480/60i" and "aspect ratio: 4:3" or "aspect ratio: 16:9", or "image quality: 720*480/60i" and "aspect ratio: 4:3". A selectable recording medium may be a tape or a card (a memory card). Reference screens for currently selectable conversion patterns are shown in FIG. 7.

Figure 8:
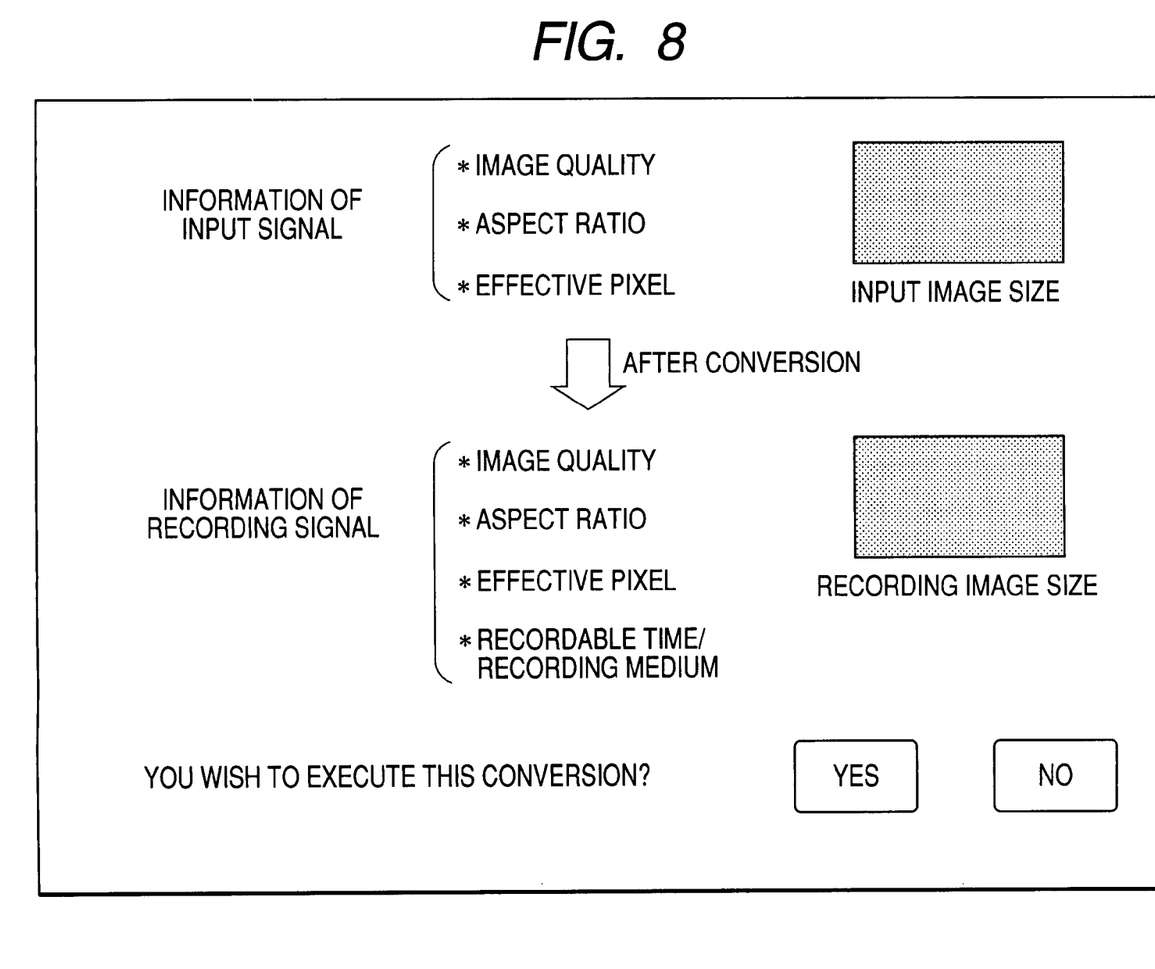
FIG. 8 is a diagram showing an example confirmation screen for the execution of the conversion process.

Referring again to FIG. 2, program control advances to step S108 and a confirmation screen is displayed on the display unit 7, so that the user can designate a desired conversion pattern and select the type of recording signal to be used for instructing the performance of the conversion process. An example of confirmation screen for an instruction for the performance of the conversion is shown in FIG. 8. When the contents are confirmed (YES is instructed by manipulating the operation unit 8), the conversion process for the input signal is initiated, under the control of the signal conversion circuit 4a. Then, under the control of the micro computer 9, the signal conversion circuit 4a converts the input signal into a recording signal of the video signal type designated by the user.

When the input signal conversion has been performed at step S108, at step S109 the recording, on a selected recording medium, of the recording signal-obtained by the conversion is started. Thereafter, program control advances to step S110, whereat a determination is made as to whether the recording has been completed. It is equivalent to the recording completion when the recording is paused and when the recording medium is full. When it is determined that the recording has been completed (YES at step S110), at step S112, the recording process is terminated.

When, as the result at step S110, it is determined that the recording has not yet been completed (NO at step S110), the recording is continued. In this embodiment, at step S111, an examination is performed to determine whether the type of the input signal has been changed during the recording. Also, during this process, an examination is performed to determine whether or not the input terminal has been disconnected.

When it is determined that the type of the input signal has not been changed (YES at step S111), program control returns to step S110, and the recording is continued. When it is determined that the type of the input signal has been changed (NO at step S111), the recording process is paused and program control returns to step S101.

Second Embodiment

Figure 9:
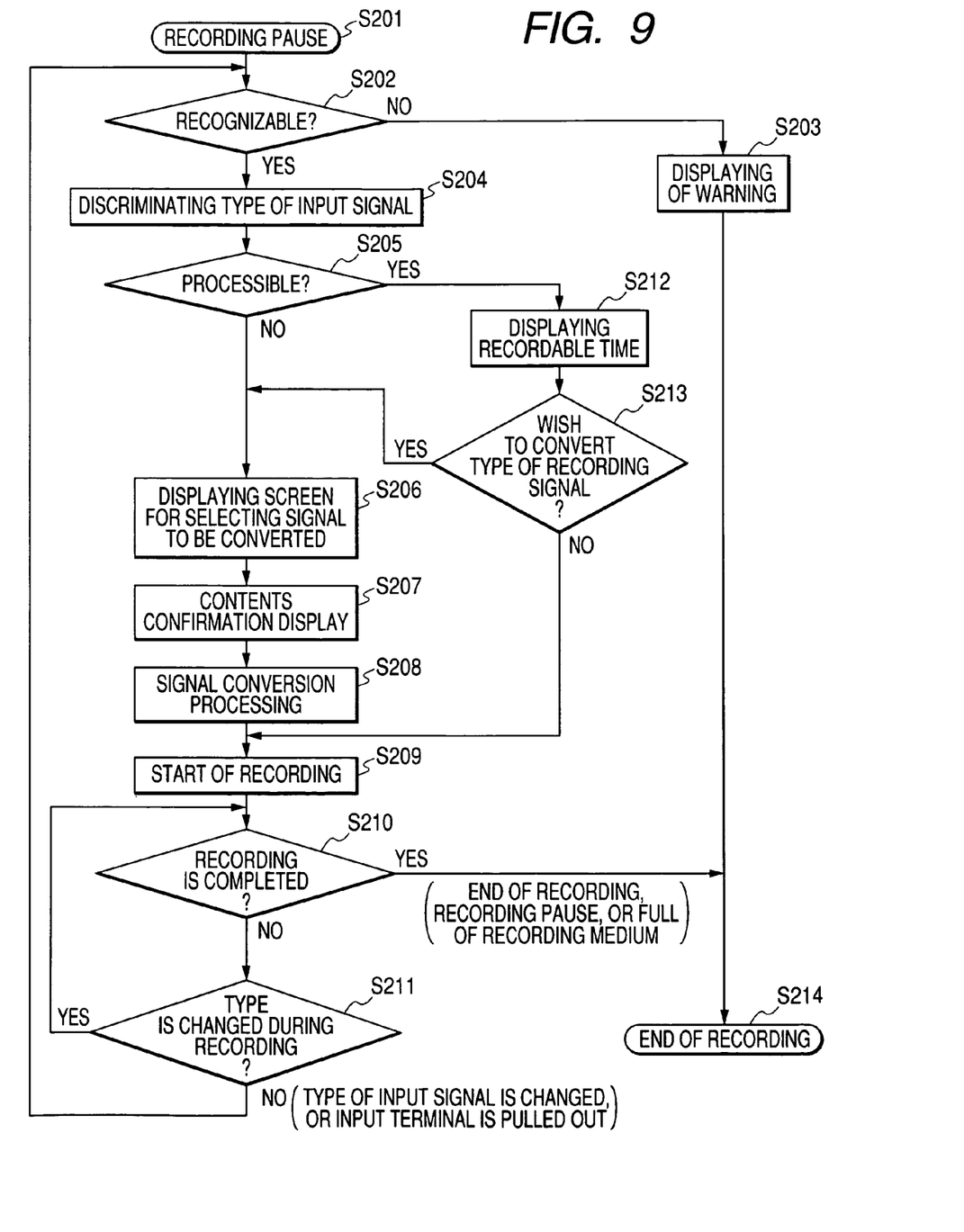
FIG. 9 is a flowchart for explaining the operation of a digital video camera according to a second embodiment of the present invention.

FIG. 9 is a flowchart showing example operation procedures performed by a digital still camera according to a second embodiment of the present invention. The configuration of the digital still camera for this embodiment is the same as that in FIG. 1.

Figure 10:
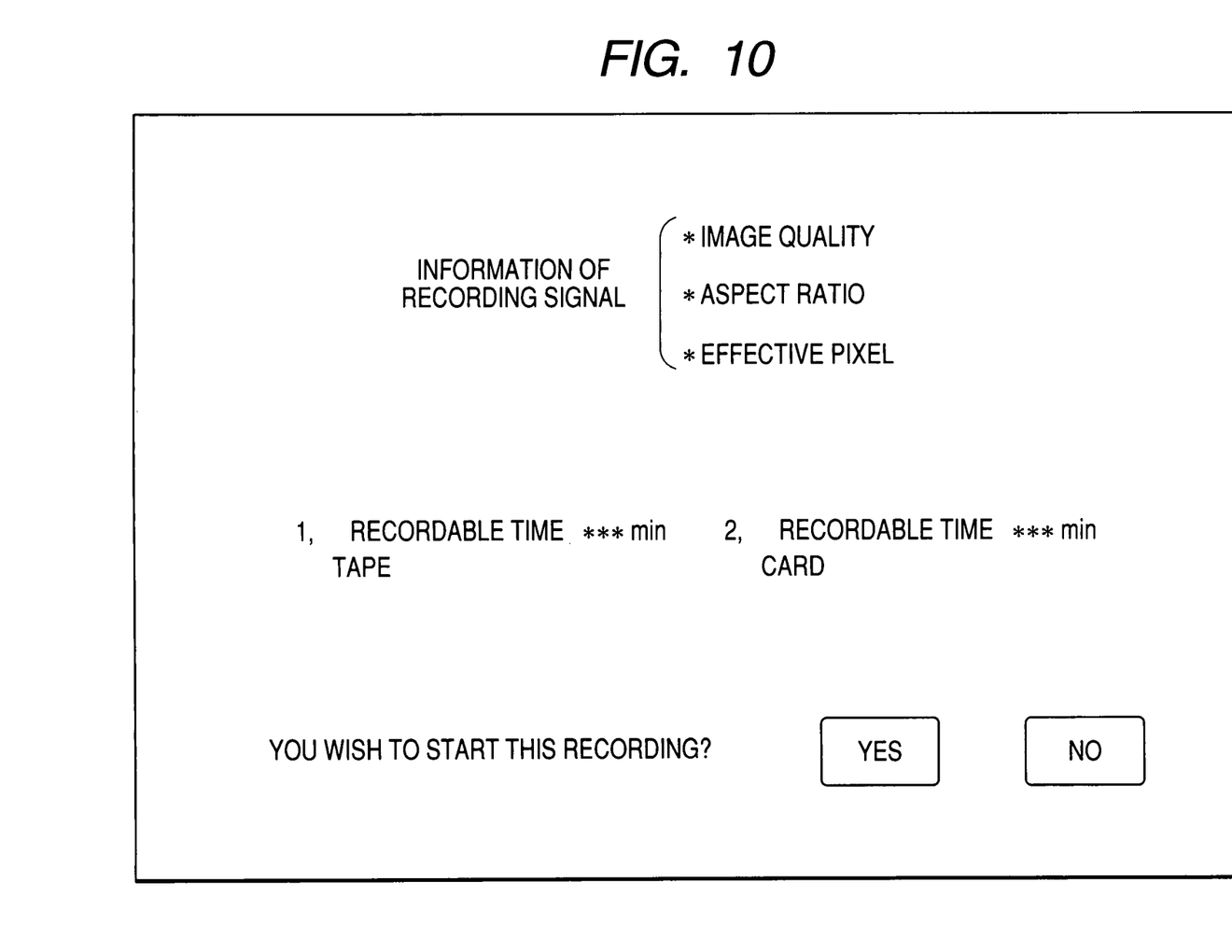
FIG. 10 is a diagram showing an example confirmation screen for notifying a user of a period of time available for recording.

The feature of the digital video camera of this embodiment is that when, relative to a recording medium, the available recordable time does not satisfy the recordable time required for an input signal, the type of recording signal for which the recordable time can be satisfied is searched for and the input signal is converted to this type. In FIG. 9, since the processes at steps S201 to S211 are the same as those for steps S101 to S111 in FIG. 2, the above explanation for steps S101 to S111 is applied for these steps. In this embodiment, when it is determined at step S205 that an input signal can be processed without its form being changed (YES at step S205), program control is shifted to step S212, and a recordable time period is displayed. An example confirmation screen at this time is shown in FIG. 10. In this embodiment, "image quality", "aspect ratio" and "effective pixels" are displayed as information concerning a recording signal, and the recording times for "tape" and "card" are individually displayed. Further, "YES" and "NO" buttons are displayed that are used to select and confirm the recording of the contents of the display screen.

At step S213, a user confirms, on the display, that the period during which the input signal is to be recorded has been satisfied, designates a recording medium, and selects to instruct "YES" or "NO". Through this process, whether the type of a recording signal is to be changed is determined. When the type of the recording signal is to be changed (the recording time is to be changed) (YES at step S213), program control is shifted to step S206, and a screen is displayed for selecting a conversion pattern used for performing the conversion process for the input signal. Thereafter, the process is performed in the same manner as in the first embodiment.

When, as a result of the processing at step s213, the type of the recording signal is not changed (NO at step S213), program control is shifted to step S209, and the recording of the input signal is started without the form being changed. Thereafter, the process is performed in the same manner as in the first embodiment.

Another Embodiment

In the above-described embodiments of the invention, discrimination of the video signal type has been performed relative to a signal input at the D terminal. However, the technique of the invention can also be applied for a signal input at the S terminal or at another terminal.

Further, individual means constituting the video signal processing apparatus for each embodiment, i.e., the signal discrimination unit, the signal conversion unit and the display control unit, can be provided under the control of the micro computer 9 when a program stored in the RAM or the ROM of the micro computer 9 is executed.

Similarly, the individual steps of the video signal processing method, i.e., the signal discrimination step, the signal conversion step and the display control step, are performed when a program stored in the RAM or the ROM of the micro computer 9 is executed and the individual sections are controlled by the micro computer 9. The program and a computer-readable storage medium on which the program is stored are included in the present invention.

Specifically, the program is recorded on a recording medium, such as a CD-ROM, or is provided for a computer through an arbitrary type of transfer medium. In addition to a CD-ROM, a recording medium on which the program is recorded can be a flexible disk, a hard disk, a magnetic tape, a magneto-optical disk or a non-volatile memory card. The transfer medium for the program can be a communication medium (e.g., a wired line, such as an optical fiber, or a wireless line) for a computer network (e.g., a LAN, a WAN such as the Internet, or a wireless communication network) and a system for the transfer and supply of program information as a carrier wave.

The program in the following cases is also included in the present invention: a case wherein a computer executes a received program to provide the functions described in the above embodiments; a case wherein the program interacts with an OS (Operating System) or other application software operated by the computer to provide the functions of the embodiments; and a case wherein all or only a part of the processing for a received program is performed, to provide the functions of the embodiments using the function extension board or the function extension unit of the computer The present invention is not limited to the above embodiments, and various changes and modifications can be made within the spirit and the scope of the present invention. Therefore, to apprise the public of the scope of the present invention, the following claims are made.

This application claims priority from Japanese Patent Applications No. 2004-231455 filed on Aug. 6, 2004 and No. 2005-184948 filed on Jun. 24, 2005, which are hereby incorporated by reference herein.

What is claimed is:
1. A video signal processing apparatus comprising:
an external input terminal;
a signal discrimination unit for discriminating a type of a video signal input at the external input terminal;
a signal conversion unit for performing conversion processing, including changing an aspect ratio of the input video signal, in a case where a discrimination result obtained by the signal discrimination unit indicates that the input video signal is not recordable in an input video signal form; and
a display control unit for, when the signal conversion unit performs the conversion processing for the input video signal, displaying, on a display screen in a list form, a plurality of icons generated from the input video signal as information for selecting the type of the input video signal to be obtained through the conversion processing,
wherein the plurality of icons include an icon generated from the input video signal to show an image state of the video signal on which the conversion processing is to be performed, and an icon generated from the input video signal to show an image state of the video signal to be provided after the input video signal is subjected to the conversion processing.
2. A video signal processing apparatus according to claim 1, wherein the display control unit displays, in a selected form, the icon corresponding to the type of the video signal that is convertible through the conversion processing.

3. A video signal processing apparatus according to claim 2, wherein the display control unit displays recording media as selectable recording destinations.

4. A video signal processing apparatus according to claim 1, wherein the display control unit displays at least one of a recordable period of time or information for a recording medium as a recording destination.

5. A video signal processing apparatus according to claim 1, wherein the display control unit displays a warning on the display screen when recognition of the input video signal fails.

6. A video signal processing apparatus according to claim 1, wherein the signal discrimination unit discriminates the aspect ratio of the input video signal by determining values of discrimination voltages on a plurality of signal discrimination lines connected to the external input terminal.

7. A video signal processing method for a video processing apparatus having an external input terminal, the method comprising:
- a signal discrimination step of discriminating a type of a video signal input at the external input terminal;
- a signal conversion step of performing conversion processing, including changing an aspect ratio of the input video signal in a case where a discrimination result obtained in the signal discrimination step indicates that the input video signal is not recordable in an input video signal form; and
- a display control step of, when the conversion processing of the input video signal is to be performed at the signal conversion step, displaying, on a display screen in a list form, a plurality of icons generated from the input video signal as information for selecting the type of the input video signal to be obtained through the conversion processing,
- wherein the plurality of icons include an icon generated from the input video signal to show an image state of the video signal on which the conversion processing is to be performed, and an icon generated from the input video signal to show an image state of the video signal to be provided after the input video signal is subjected to the conversion processing.

8. A non-transitory computer-readable storage medium storing a computer program for executing a video signal processing method for a video processing apparatus having an external input terminal, the method comprising:
- a signal discrimination step of discriminating a type of a video signal input at the external input terminal;
- a signal conversion step of performing conversion processing, including changing an aspect ratio of the input video signal in a case where a discrimination result obtained in the signal discrimination step indicates that the input video signal is not recordable in an input video signal form; and
- a display control step of, when the conversion processing of the input video signal is to be performed at the signal conversion step, displaying, on a display screen in a list form, a plurality of icons generated from the input video signal as information for selecting the type of the input video signal to be obtained through the conversion processing,
- wherein the plurality of icons include an icon generated from the input video signal to show an image state of the video signal on which the conversion processing is to be performed, and an icon generated from the input video signal to show an image state of the video signal to be provided after the input video signal is subjected to the conversion processing.

* * * * *